United States Patent [19]

Sempio et al.

[11] Patent Number: 5,180,634
[45] Date of Patent: Jan. 19, 1993

[54] COEXTRUDED MULTILAYER AND A PROCESS FOR PREPARING THE SAME

[75] Inventors: Carlo Sempio, Busto Arsizio; Andrea Anghileri, Milan; Marc Binaghi, Milan; Tullo Ronchetti, Milan; Italo Vailati, Castelanza, all of Italy

[73] Assignee: Elf Atochem Italia S.r.l., Milan, Italy

[21] Appl. No.: 584,282

[22] Filed: Sep. 18, 1990

[30] Foreign Application Priority Data

Sep. 18, 1989 [IT] Italy .................. 21750 A/89

[51] Int. Cl.$^5$ .......................... B32B 27/00
[52] U.S. Cl. ................... 428/336; 428/421; 428/520; 156/244.11
[58] Field of Search ............ 428/421, 520, 336; 156/244.11

[56] References Cited

U.S. PATENT DOCUMENTS 4,647,509  3/1987  Wallace et al. ............... 428/474.9
5,030,394  7/1991  Siestes et al. ................. 428/421

FOREIGN PATENT DOCUMENTS 0060421  9/1982  European Pat. Off. .
151812   8/1985  European Pat. Off. .
2236903  3/1974  Fed. Rep. of Germany .
2071007  9/1981  United Kingdom .
2080199  2/1982  United Kingdom .

Primary Examiner—Edith L. Buffalow
Attorney, Agent, or Firm—Bryan Cave

[57] ABSTRACT

Coextruded multilayer sheets comprising a first outer layer consisting of a blend containing polyvinylidene fluoride having an average mollecular weight (Mw) not higher than 250,000 and an acrylic resin and at least a layer of a homo or copolymer of an alkylmethacrylate, having a Vicat degree (49N, 50° C/h) of at least 90° C., in mixture with 5-40% by weight of an elastomer in the grafted form.

12 Claims, No Drawings

COEXTRUDED MULTILAYER AND A PROCESS FOR PREPARING THE SAME

DESCRIPTION OF THE INVENTION

The present invention relates to coextruded multilayer sheets and to a process for the preparing the same.

More particularly the present invention relates to coextruded multilayer sheets based on methacrylic polymers, to a process for preparing the same and to the use of said coextruded multilayer sheets for the preparation of hydrosanitary articles and coachwork parts.

Coextruded sheets based on methacrylic resins are known to the prior art. For instance, sheets consisting of a layer of polymethylmethacrylate coupled with at least a layer of a shock-resisting polymethylmethacrylate are described in British patent 2.080.199.

These sheets, although they have excellent mechanical properties, present an insufficient resistance against the aggressive action of the chemical agents contained both in the products for the personal hygiene, such as after-shaving products, perfumes and the like, and in the products for the domestic cleaning.

It is also known that, protective layers based on fluorinated polymers have been used to improve the chemical resistance of some plastic materials.

For instance, In European patent application 151.812 layers are disclosed consisting of a thermoplastic substrate coated with a protective thin plate based on a blend of polyvinylidene fluoride and polymethyl=methacrylate. The substrate must consist either of a polymer having an acrylic character or of a polymer compatible with the acrylic resins, in order to achieve a good adhesion between the parts. ABS, polycarbonate, ABS/polycarbonate alloys, polyvinylchloride and copolymer methyl-methacrylate-acrylonitrile-butadiene-styrene (MABS) have been cited in particular as polymers for the substrate.

The protective thin plate in the sheets of the prior art carries out exclusively a protection against the aggressive agents and in no exemplified case it allows to keep the thermo-mechanical characteristics of the substrate.

The Applicant has now found that, if use was made of a polyalkylmethacrylate (for instance polymethylmetha=crylate) as thermoplastic material for the substrate and of an alloy of a particular polyvinylidene fluoride and of the same polyalkylmethacrylate as material for the protective thin plate, even multilayer sheets could be obtained by coextrusion, in which sheets the protective layer, besides having an excellent resistance against the aggressive agents, also presented high thermo-mechanical characteristics, which could be compared with the ones of the substrate.

Therefore an object of the present invention concerns coextruded multilayer sheets comprising:

a) a first outer layer consisting of a blend containing 40-70% by weight of polyvinylidene fluoride having an average molecular weight (MW) not higher than 250.000, 30-60% by weight of a homo or copolymer of an alkylmethacrylate and 10-30% by weight, with respect to the sum of the preceding components, of an elastomer in the grafted form;

b) at least a layer of a homo or copolymer of an alkylmethacrylate in mixture with 5-40% by weight of an elastomer in the grafted form; and c) optionally at least an intermediate layer between (a) and (b) of a homo or copolymer of an alkylmethacrylate. A further object of the present invention concerns coextruded multilayer sheets comprising:

a') a first outer layer consisting of a blend containing 50-70% by weight of polyvinylidene fluoride having an average molecular weight (Mw) not higher than 250.000 and 30-50% by weight of a homo or copolymer of an alkylmethacrylate;

b') at least a layer of a homo or copolymer of an alkylmethacrylate in mixture with 5-40% by weight of an elastomer in the grafted form; and c') optionally at least an intermediate layer between (a') and (b') of a homo or copolymer of an alkylmethacrylate.

The polyvinylidene fluoride used in the sheets object of the present invention is preferably a homopolymer having an average molecular weight (Mw) not higher than 250.000, preferably between 200.000 and 250.000 and a viscosity in the melted state, measured by means of a capillary rheometer at 230° C. and at a shear rate of 100 sec$^{-1}$, not higher than 15.000 poise, preferably between 8.000 and 15.000 poise.

Copolymers of polyvinylidene fluoride containing up to 30% by weight of other ethylenically unsaturated monomers such as tetrafluoroethylene, chlorotrifluoro=ethylene, hexafluoropropylene, ethylene and the like, and having the above mentioned physical-chemical and rheological characteristics, can be used as well.

Homopolymers and copolymers of polyvinylidene fluoride are described in U.S. Pat. No. 2.435.537, 3.031.437 and 3.193.539.

A product having the above mentioned characteristics, particularly suitable for the sheets, object of the present invention, is Kynar 720 produced by Pennwalt Company.

The acrylic resins consist of one or more methacrylic polymers optionally in mixture with at least a grafted elastomer.

The methacrylic polymers, and in particular the ones used in mixture with polyvinylidene fluoride, comprise both homo and copolymers of the alkyl esters of methacrylic acid, in which the alky group has from 1 to 8 carbon atoms and are characterized by a Vicat degree (49N, 50° C./h) of at least 90° C. Examples of such esters are methylmethacrylate, ethyl=methacrylate, propylmethacrylate, isopropylmethacrylate, butylmethacrylate and the like.

These monomers can be used alone or in mixture with other products, for instance acrylates, such as, methylacrylate, ethylacrylate, propylacrylate, isopropyl=acrylate, butylacrylate and the like or ethylenically unsaturated monomers such as styrene, alpha-methylstyre=ne, acrylonitrile and the like.

The preferred methacrylic polymer is polymethylmetha=crylate containing 0-20% by weight of methylacrylate and having a molecular weight not higher than 150.000, preferably between 100.000 and 150.000 and a viscosity in the melted state not higher than 30.000 poise, preferably between 20.000 and 30.000 poise.

The grafted elastomer is preferably an acrylic elastomer cross-linked and grafted with an alkylmethacrylate, preferably methylmethacrylate. Examples of acrylic elastomers are the polymers of the alkyl esters of acrylic acid, in which the alkyl group has from 1 to 8 carbon atoms.

Examples of such esters are methylacrylate, ethyl=acrylate, propylacrylate, isopropylacrylate, butylacrylate and the like, which are used alone or in mixture with amounts up to 20% by weight of other acrylic monomers such as methylmethacrylate or other ethylenically unsaturated monomers such as styrene, alpha-methylstyrene and the like. Grafted acrylic elastomers are described in Italian patent 1.199.836 by the Applicant.

The grafted elastomer can be available, for the achievement of coextruded sheets, object of the present invention, already premixed with the methacrylic polymer. Mixtures of grafted elastomers can be used as well.

The thickness of the coextruded sheets, object of the present invention, can range within wide limits; one prefers, however, to operate with thicknesses ranging from 2 to 12 mm, generally from 4 to 8 mm. The thickness of every single layer ranges from 0.1 to 10 mm, preferably from 0.3 to 6 mm.

A process for the preparation of the coextruded multilayer sheets, object of the present invention comprises coextruding a plurality of layers by means of independent extruders, connected at the outlet with an only extrusion head, said process being characterized in that:

i) a blend containing 40-70% by weight of polyvinylidene fluoride having an average molecular weight not higher than 250.000, 30-60% by weight of a homo or copolymer of an alkylmethacrylate and 10-30% by weight, with respect to the sum of the preceding components, of an elastomer in the grafted form, is fed to a first extruder;

ii) optionally a homo or copolymer of an alkylmethacrylate is fed to at least a second extruder; and iii) a blend containing a homo or copolymer of an alkylmethacrylate and 5-40% of an elastomer in the grafted form is fed to at least a third extruder; and wherein the layer coming from step (ii) is, if present, intermediate to the layers coming from steps (i) and (iii).

A further process comprises coextruding a plurality of layers by means of independent extruders, connected at the outlet with an only extrusion head, said process being characterized in that:

i') a blend containing 50-70% by weight of polyvinyl=idene fluoride having an average molecular weight not higher than 250.000 and 30-50% by weight of a homo or copolymer of an alkylmethacrylate is fed to a first extruder;

ii') optionally a homo or copolymer of an alkylmethacrylate is fed to at least a second extruder; and iii') a blend containing a homo or copolymer of an alkylmethacrylate and 5-40% by weight of an elastomer in the grafted form is fed to at least a third extruder; and wherein the layer coming from step (ii') is, if present, intermediate to the layers coming from steps (i') and (iii').

Besides the above mentioned components, we can load to the extruders further additives, which are generally used in combination with the plastic materials, such as dyes, pigments anti-UV agents, antioxidizers, plasticizers, inert reinforcement fillers and the like.

The coextruded sheets, object of the present invention, can be processed by thermomolding, by keeping the layer containing PVdF as surface at sight and can be used advantageously in the field of the production of hydrosanitary articles such as bath-tubs, shower plates, wash-basins, bidet, walls equipped for sauna or baths and the like or such as coachwork parts, such as roofs, headlight-covers, luggage car covers, doors, wheel-covers and the like.

The sheets obtained by the present invention, if compared with the usual coextruded materials, present, on the layer containing PVdF, the advantages concerning a higher resistance against chemical agents, a higher impact strength and a lower water absorption. This characteristic proves to be particular advantageous when the sheets are used for the production of hydrosanitary articles. In fact, the main cause of yielding of these manufactures is connected with the inner tension produced by the discontinuous contact with hot and cold water, which in the long run, gives rise to the formation of crazes, which afterwards spread till they cause the breaking of the piece. From this point of view the sheets of the present invention are less subjected to water absorption, if compared not only with the extruded acrylic materials, but even with the cast ones. Therefore they combine in themselves the characteristics of an excellent moldability, peculiar of the extruded materials, with the chemical resistance (moreover even improved) of the pouring materials.

In order to better understand the present invention and to put it into practice, a few examples will be reported hereinafter, by way of illustration but not of limitation.

EXAMPLES 1 (unpigmented sheet)

One added into a two truncated cone mixer, granules of polyvinylidene fluoride (PVdF) having a low molecular weight (Mw 220.000, viscosity 10.000 Poise), supplied by Pennwalt Company and denominated KYNAR 720, and granules of polymethylmethacrylate for extrusion (PMMA) (copolymer of methylmethacrylate and methylacrylate, Mw 145.000, viscosity 30.000 poise) denominated VEDRIL 9K, in a ratio by weight of 60 and 40%.

After having obtained a homogeneous mix, a BANDERA TR 30 (L/D=25) one-screw extruder was fed with said mix, by operating under the following conditions:

| ZONE TEMPERATURES: | |
| --- | --- |
| FEEDING | 190° C. |
| PLASTICIZATION | 200° C. |
| DOSAGE | 220° C. |
| HEAD | 230° C. |
| SCREW RATE: | 50 rmp |
| DEGASSING PRESSURE: | 740 mm HG |

Granules having high transparency were obtained, which after having been injection molded as DIN specimens, presented rather poor thermic and mechanical characteristics, as set forth in the following table: Vicat temperature (49N, 50° C./h) DIN 53460 50° C. Rockwell hardness (Scale R) ASTM D 785 60 Modulus of elasticity to bending DIN 53457 1900 MPa.

The chemical resistance of the blend was also measured by stress-cracking tests, consisting in subjecting the material to the contemporaneous action of constant deformations exerted from the outside and to the contact with aggressive chemical substances.

The chemical resistance of the blend, expressed as Ec, deformation below which the crazes do not form, proved to be little higher than the one of PMMA (in the presence of ethyl alcohol: $\epsilon c=0,3\%$ as against 0,2%).

The per cent water absorption, measured according to ASTM D570 rule on specimens, which had been extruded and afterwards conditioned over 24 hours in a stove at 50° C., proved to be equal to 0,05%, as against the value of 0,3% of the PMMA for extrusion.

The granules, prepared as described, hereinbefore, were fed to a BANDERA 80 (L/D ratio=30) extruder, connected with a BANDERA 160 (L/D ratio=32) extruder. The latter was fed with impact resisting PMMA (HIPMMA) consisting of a blend of PMMA for extrusion and of 33% by weight of a grafted acrylic elastomer, prepared according to example 1 of Italian patent 1.199.836. A coextruded sheet was obtained consisting of two A and C overlapped layers.

Layer A consisted of the blend described hereinbefore and was 1 mm thick, whereas lower layer C was 4 mm thick.

The operating conditions stated on the extruders were as follows:

|  | BANDERA 160 | BANDERA 80 |
| --- | --- | --- |
| FEEDING ZONE TEMPERATURE | 195° C. | 260° C. |
| PLASTICIZATION ZONE TEMPERATURE | 250° C. | 265° C. |
| DOSAGE ZONE TEMPERATURE | 235° C. | 245° C. |
| HEAD TEMPERATURE | 240° C. | |
| TEMPERATURE OF THE MELTED MATERIAL | 230° C. | |
| SCREW REVOLUTIONS | 25 rpm | |
| CYLINDER TEMPERATURE | 90° C.-80° C.-120° C. | |

By testing the characteristics of the sheet, and in particular the ones of upper layer A, one noted that they were different from the characteristics of the fed blend and precisely one observed that, the thermic and mechanical properties were improved as follows: Vicat temperature (49N, 50° C./h) DIN 53460 85° C. Rockwell hardness (Scale M) ASTM D 785 75 Modulus of elasticity to bending DIN 53457 2900 MPa.

The value of the modulus of elasticity had been obtained by measuring the modulus of elasticity to tensile stress, of the coextruded sheet, by means of the following formula:

$$E_{coex} = \frac{H_{blend} * E_{blend} + H_{substr.} * E_{substr.}}{H_{coex}}$$

wherein $E_{coex}$ and $H_{coex}$ were the modulus of elasticity and the thickness of the coextruded sheet respectively, $E_{blend}$ and $H_{blend}$ the modulus of elasti=city and the thickness of the layer of the PVdF-PMMA blend, whereas $E_{substr.}$ and $H_{substr.}$ represented the modulus of elasticity and the thickness of the support layer in impact resisting PMMA.

The resistance to stress-cracking presented a considerable increase as well (Ec=0,5% in the presence of ethyl alcohol).

Moreover the coextruded sheet presented a good value of resilience, equal to 4,2 kJ/m² for impact test to bending with sharp notch.

An analysis by differential scanning calorimetry (DSC) carried out on a fragment of layer A, drawn from the coextruded sheet, showed the existence of a crystalline phase, attributable to PVdF, absent on the contrary in the blend obtained by injection molding.

EXAMPLE 2 (pigmented sheet)

One operated as in example 1, in this case, however, layers A and C were pigmented white.

To this purpose, the same ingredients were mixed in the apparatuses already described in the preceding example, with the difference that also pigments based on titanium oxide were added to mixes A and C.

In order to obtain a homogeneous dispersion of the pigment in layer A, the addition of said pigment was carried out before the granulation process.

The pigment of layer C was added to the granules, directly in the hopper, before extruding the sheet.

The measured values of the thermic and mechanical properties did not differ from the ones set forth in the first Example.

EXAMPLE 3 (pigmented sheet)

One operated as in example 2, by utilizing, however, impact-resisting polymethylmethacrylate (HIPMMA) in layer A, instead of PMMA, and moreover by modifying the blend composition.

Layer A, being 1 mm thick, was a polymeric blend, which consisted of 40% by weight of PVdF (KYNAR 720) and of 60% of impact-resisting PMMA, which in its turn consisted of 70% PMMA for extrusion and of 30% of a grafted acrylic elastomer, the latter had been prepared as described in example 2 of Italian patent 1.199.836.

Layer C consisted of impact-resisting PMMA as in example 1 and was 4 mm thick.

The preparation of the blend and its subsequent granulation was carried out according to the same modalities and to the same techniques described in example 1.

The blend obtained by granulation, subsequently injection molded, presented the following thermic and mechanical properties:
Vicat temperature (49N, 50° C./h) DIN 53460 55° C.
Rockwell hardness (Scale M) ASTM D 785 50
Modulus of elasticity to bending DIN 53457 1500 MPa The per cent water absorption, measured according to ASTM D570 rule on specimens, which had been extruded and afterwards conditioned for 24 hours in an oven at 50° C., proved to be equal to 0,15%, as against the value of 0,36% of the impact-resisting PMMA for extrusion.

The subsequent coextrusion of the sheet was carried out by using the same apparatuses and under the same conditions described in example 1. In this case as well, one observed an increase of the thermic and mechanical properties of layer A with respect to the starting situation.
Vicat temperature (49N, 50° C./h) DIN 53460 82° C.
Rockwell hardness (Scale M) ASTM D 785 70
Modulus of elasticity to bending DIN 53457 2200 MPa The resistance of the sheet to stress-cracking showed a good improvement as well (in the presence of ethyl alcohol from Ec=0,4% to Ec=0,6%).

EXAMPLE 4

One operated as in example 1, by preparing a polymeric blend PVdF-PMMA (KYNAR 720-VEDRIL 9K), having a ratio by weight 60% and 40%, by utilizing the same apparatuses under the same conditions already described.

The difference with respect to example 1 consisted in that, a trilayer sheet A, B and C was produced instead of coextruded sheet A and C.

Layer A consisted of blend PVdF-PMMA and was 1 mm thick.

Intermediate layer A consisted of PMMA for extrusion VEDRIL 9K and was 3 mm thick.

Support layer C consisted of shock-resisting PMMA as in example 1 and was 1 mm thick.

The extrusion of the trilayer sheet was carried out by using three extruders BANDERA 80, BANDERA 160 and BANDERA 80 (L/D:30, 32 and 30) respectively.

The following operating conditions were used in the three machines:

|  | BAN-DERA 80 | BAN-DERA 160 | BAN-DERA 80 |
| --- | --- | --- | --- |
| TEMPERATURE OF THE FEEDING ZONE | 260° C. | 195° C. | 255° C. |
| TEMPERATURE OF THE PLASTICIZATION ZONE | 265° C. | 250° C. | 260° C. |
| TEMPERATURE OF THE DOSAGE ZONE | 245° C. | 235° C. | 240° C. |
| HEAD TEMPERATURE | | 240° C. | |
| TEMPERATURE OF THE MELTED MATERIAL | | 230° C. | |
| SCREW REVOLUTIONS | | 25 rpm | |
| CYLINDER TEMPERATURE | | 90° C.-80° C.-120° C. | |

The obtained sheet presented a value of resilience equal to 1,5 kJ/m$^2$, measured by means of impact tests to bending with sharp notch.

The advantages given by the trilayer sheet were essentially economic, as the cost of conventional PMMA was lower, if compared with the one of impact-resisting PMMA.

EXAMPLE 5 (comparative example)

Sheet coextruded according to example 2, but the used PVdF, produced by Pennwalt Company and denominated KYNAR 740, had a higher molecular weight (Mw 282.000, viscosity 20.000 Poise).

The PVdF-PMMA blend in a ratio by weight 60%-40%, obtained by granulation, presented poor thermic and mechanical characteristics and a low resistence to stress-cracking.

The subsequent phase of coextrusion of the sheet did not improve the thermic and mechanical properties, which remained therefore at a level that was clearly lower than the one of the conventional PMMA, as the obtained data showed:
Vicat temperature (49N, 50° C./h) DIN 53460 66° C.
Rockwell hardness (Scale M) ASTM D 785 57
Modulus of elasticity to bending DIN 53457 1900 MPa The degree of resistance to stress cracking remained at a level equal to the one of the conventional PMMA.

The example showed that too high molecular weights of PVdF did not allow the transformation of the blend properties during the coextrusion phase.

EXAMPLE 6 (comparative example)

Sheet coextruded under the same modalities of example 2, but the composition of the blend, layer A consisted of, had changed: the ratio by weight between PVdF (KYNAR 720) and PMMA (VEDRIL 9K) was 40%-60%.

The thermic and mechanical properties of the blend, obtained by granulation, proved to be rather low:
Vicat temperature (49N, 50° C./h) DIN 53460 65° C.
Rockwell hardness (Scale M) ASTM D 785 60
Modulus of elasticity to bending DIN 53457 2100 MPa The degree of resistance to stress-cracking proved to be low as well (Ec 0,2% in ethyl alcohol with formation of macroscopic crazes).

The subsequent coextrusion of the sheet, carried out under the same modalities of example 1 did not bring about any change in the thermic and mechanical properties and in the resistance to stress-cracking of layer A, consisting of the above described blend.

The example showed as the percentage of used PMMA was higher than the highest value that was necessary to obtain the crystallization of PVdF inside the blend, as, on the other hand, it was verified by DSC analysis, which did not show any melting peak attributable to the crystalline phase of PVdF.

EXAMPLE 7 (comparative example)

Sheet coextruded according to Example 3, but the used PVdF, produced by Pennwalt Company and denominated KYNAR 740, had higher molecular weight (Mw 282.000, viscosity 20.000 Poise).

The shock-resisting PVdF blend, in a ratio by weight 40%-60%, obtained by granulation, showed poor thermic and mechanical characteristics and a low resistance to stress-cracking.

The subsequent phase of coextrusion of the sheet did not improve the thermic and mechanical properties, which remained thus at a lower level with respect to shock-resisting PMMA, as shown by the obtained data:
Vicat temperature (49N, 50° C./h) DIN 53460 64° C.
Rockwell hardness (Scale M) ASTM D 785 41
Modulus of elasticity to bending DIN 53457 1800 MPa This example showed that, in the blends containing shock-resisting PMMA, too high molecular weights in PVdF did not allow the transformation of the blend properties during the coextrusion phase.

EXAMPLE 8 (comparative example)

Sheet coextruded according to the same modalities of example 3, but the composition of the blend, layer A consisted of, had changed: the ratio by weight between PVdF (KYNAR 720) and shock-resisting PMMA (VEDRIL 22E) was 20%-80%.

The thermic and mechanical properties of the blend obtained by granulation were lower, if compared with the ones of the shock-resisting PMMA, the blend consisted of, as the following data showed:
Vicat temperature (49N, 50° C./h) DIN 53460 75° C.
Rockwell hardness (Scale M) ASTM D 785 60
Modulus of elasticity to bending DIN 53457 1800 MPa The resistance to stress-cracking of the blend was lower, if compared with the one of the shock-resisting PMMA (in ethyl alcohol Ec=0,2% as against E=0,4%).

After the process of coextrusion, in layer A one noted no change in the thermic and mechanical properties or in the resistance to stress-cracking.

In this case as well, as in example 6, the percentage of used PVdF was lower than the lowest value that was necessary to obtain a crystallization inside the blend, as, on the other hand, it was shown by the absence of the melting peak of the crystalline phase by DSC analysis.

EXAMPLE 9

A coextruded sheet, being 5.0 mm thick, produced as described in Example 2, had been thermomolded in the form of a bath tub, by using the operating conditions typical of this technology.

The sheet had been thermomolded in such a way that layer A, consisting of blend PVdF-PMMA, formed the surface at sight of the manufacture, i.e. the surface in contact with the water.

The process technology provided for:

preheating of the sheet in a hot air furnace at a temperature of 170° C. or by exposure for about 150 seconds at infrared radiant panels kept at a temperature of 600° C.

the use of a thermomolder having a die equipped with a vacuum system;

the subsequent application of a layer in polyester resin stiffened with fiber glass, on the lower side of the thus obtained tub (layer C).

Afterwards the tub was subjected to the aging test as provided by European norm EN 198, which provided for the inlet, on alternate cycles, of amounts of cold water and hot water (75° C.) and subsequent check of the possible damages.

After 1000 cycles the tub was cut in two halves and no delamination was observed.

EXAMPLE 10

A sheet, being 5.0 mm thick, produced as described in Example 3, was hot thermomolded in order to obtain a coachwork part (hood) for motor use.

As in Example 9 the transformation technology comprised the use of a heating furnace in order to bring the sheet to a temperature higher than the softening temperature, a thermomolder equipped with a pumping system for vacuum and the application of a layer of polyester resin stiffened with fiber glass.

The thermomolding process was carried out in such a way that layer A formed the surface at sight of the manufacture; the polyester resin stiffened with fiber glass was applied successively on layer C.

The surface of the thus obtained thermomolded manufacture was put into contact with pure isopropylic alcohol, in order to verify the properties of chemical resistance of shock-resisting blend PVdF-PMMA; the subsequent check did not show phenomena of stress-cracking.

EXAMPLE 11

By using two coextruded sheets prepared according to examples 2 and 3, two bath tubs were produced as described in Example 9.

One carried out on both tubs the tests according to norm EN 198 and in particular the following tests:
resistance to thermic cycles: according to the method of test A.3 of said norm;
resistance to chemical products for domestic use; according to method of test A.4 of said norm;
test of impact resistance of the tub: according to the method of test A.5 of said norm. Result of the tests:
resistance to thermic cycles: the norm provides that the tub has to resist to 100 cycles; both test tubs resisted to 1000 thermic cycles without damages;
resistance to chemical products for domestic use: both tubs did not present any damage or stains after having been subjected to the reactants listed in the norm;
resistance to impact tests: after having carried out the tests, the tubs did not present any damage.

EXAMPLE 12

By using a coextruded sheet produced according to example 2 and subsequently processed as in example 9, one obtained a bath tub, which was subjected to the following test:
1000 thermic cycles according to European norm EN 198 A.3; at the end of the test no defect or damage was observed.

After the cycles one carried out a test of resistance to the following chemical products, according to method A.4 of norm EN 198:
denatured ethyl alcohol
spirit of turpentine
eau - de - Cologne
red nail - varnish
after - shaving lotion.

At the end of the test the tub did not present any damage or stain; we must note that the test of chemical resistance was carried out on the tub, after it had already undergone the test of resistance to the thermic cycles, whereas the norm provided that the tests had to be carried out on tubs as such (of course a less critical condition).

We claim:

1. Multilayer coextruded sheets comprising:
   a) a first outer layer consisting of a blend containing 40-70% by weight of polyvinylidene fluoride having an average molecular weight (Mw) not higher than 250.000, 30-60% by weight of a homo or copolymer of an alkylmethacrylate and 10-30% by weight, with respect to the sum of the preceding components, of an elastomer in the grafted form;
   b) at least a layer of a homo or copolymers of an alkyl=methacrylate admixture with 5-40% by weight of an elastomer in the grafted form; and
   c) optionally at least an intermediate layer between (a) and (b) of a homo or copolymer of an alkylmethacrylate.

2. Multilayer coextruded sheets comprising:
   a') a first outer layer consisting of a blend containing 50-70% by weight of polyvinylidene fluoride having an average molecular weight (Mw) not higher than 250.000 and 30-50% by weight of a homo or copolymer of an alkylmethacrylate;
   b') at least a layer of a homo or copolymer of an alkylmethacrylate admixture with 5-40% by weight of an elastomer in the grafted form; and
   c') optionally at least an intermediate layer between (a') and (b') of a homo or copolymer of an alkylmethacrylate.

3. Sheets according to claim 1, wherein the polyvinylidene fluoride has an average molecular weight ranging from 200.000 to 250.000 and a viscosity in the melted state, measured by means of a capillary rheometer at 230° C. and at a shear rate of 100 sec$^{-1}$, not higher than 15.000 poise, preferably between 8.000 and 15.000 poise.

4. Sheets according to claim 1, wherein the acrylic resins consist of one or more methacrylic polymers, optionally admixture with at least a grafted elastomer.

5. Sheets according to claim 1, wherein the methacrylic polymers comprise both homo and copolymers of the alkyl esters of methacrylic acid, wherein the alkyl group has from 1 to 8 carbon atoms, and have a Vicat degree (49N, 50° C./h) of at least 90° C.

6. Sheets according to claim 5, wherein the methacrylic polymer is polymethylmethacrylate containing 0-20% by weight of methylacrylate and having a molecular weight not higher than 150.000, preferably between 100.000 and 150.000 and a viscosity in the melted state not higher than 30.000 poise, preferably between 20.000 and 30.000 poise.

7. Sheets according to claim 1, wherein the grafted elastomer is an acrylic elastomer, such as a $C_1$-$C_8$ alkyl ester of acrylic acid, cross-linked and grafted with an alkylmethacrylate preferably methylmethacrylate.

8. Sheets according to claim 1, wherein the grafted elastomer is premixed with the methacrylic polymer.

9. Sheets according to claim 1, being between 2 and 12 mm thick, generally between 4 and 8 mm.

10. Sheets according to claim 1, wherein the thickness of every single layer ranges from 0.1 to 10 mm, preferably from 0.3 to 6 mm.

11. A process for the preparation of the coextruded multilayer sheets according to claim 1, comprising coextruding a plurality of layers by means of independent extruders connected at the outlet with an only extrusion head, said process being characterized in that:
  i) a blend containing 40-70% by weight of polyvinylidene fluoride having an average molecular weight not higher than 250.000, 30-60% by weight of a homo or copolymer of an alkylmethacrylate and 10-30% by weight, with respect to the sum of the preceding components, of an elastomer in the grafted form, is fed to a first extruder;
  ii) optionally a homo or copolymer of an alkylmethacrylate is fed to at least a second extruder; and
  iii) a blend containing a homo or copolymer of an alkylmethacrylate and 5-40% by weight of an elastomer in the grafted form is fed to at least a third extruder;

and wherein the layer coming from step (ii) is, intermediate to the layers coming from steps (i) and (iii).

12. A process for the preparation of the coextruded multilayer sheets according to claim 2, comprising coextruding a plurality of layers by means of independent extruders, connected at the outlet with an only extrusion head, said process being characterized in that:
  i') a blend containing 50-70% by weight of polyvinylidene fluoride having an average molecular weight not higher than 250.000 and 30-50% by weight of a homo or copolymer of an alkylmethacrylate is fed to a first extruder;
  ii') optionally a homo or copolymer of an alkylmethacrylate is fed to at least a second extruder; and
  iii') a blend containing a homo or copolymer of an alkylmethacrylate and 5-40% by weight of an elastomer in the grafted form is fed to at least a third extruder;

and wherein the layer coming from step (ii') is, intermediate to the steps coming from steps (i') and (iii').

* * * * *